United States Patent
Van Wijngaarden et al.

(10) Patent No.: US 8,081,560 B2
(45) Date of Patent: Dec. 20, 2011

(54) METHOD AND APPARATUS FOR SELF-TUNING PRECODER

(75) Inventors: Adriaan J. De Lind Van Wijngaarden, New Providence, NJ (US); Gerhard Guenter Theodor Kramer, Chatham, NJ (US); Carl J. Nuzman, Union, NJ (US); Philip Alfred Whiting, New Providence, NJ (US); Miroslav Zivkovic, 's-Gravenhage (NL)

(73) Assignee: Alcatel Lucent, Paris (FR)

( * ) Notice: Subject to any disclaimer, the term of this patent is extended or adjusted under 35 U.S.C. 154(b) by 225 days.

(21) Appl. No.: 11/848,684

(22) Filed: Aug. 31, 2007

(65) Prior Publication Data

US 2009/0059780 A1    Mar. 5, 2009

(51) Int. Cl.
    *H04J 1/12*    (2006.01)
(52) U.S. Cl. .................................. 370/201; 375/260
(58) Field of Classification Search .................. 370/201; 375/260
    See application file for complete search history.

(56) References Cited

U.S. PATENT DOCUMENTS

| | | | |
|---|---|---|---|
| 6,519,705 B1 * | 2/2003 | Leung | 713/300 |
| 6,859,622 B1 * | 2/2005 | Jiang et al. | 398/25 |
| 7,433,416 B1 * | 10/2008 | Banister | 375/267 |
| 2006/0029148 A1 * | 2/2006 | Tsatsanis | 375/267 |
| 2007/0160162 A1 * | 7/2007 | Kim et al. | 375/267 |
| 2008/0130478 A1 * | 6/2008 | Schenk | 370/201 |
| 2008/0260058 A1 * | 10/2008 | Li | 375/260 |
| 2009/0116639 A1 * | 5/2009 | Zimmerman et al. | 379/417 |
| 2010/0142633 A1 * | 6/2010 | Yu et al. | 375/260 |

FOREIGN PATENT DOCUMENTS

| | | |
|---|---|---|
| EP | 1109328 | 6/2001 |
| WO | PCTUS2008010057 | 12/2008 |

OTHER PUBLICATIONS

R. Cendrillon,"Multi-User Signal and Spectra Coordination for Digital Subscribers Lines," Ph.D. thesis, Department of Electrical Engineering, Dec. 2004, 200 pages, Belgium. P. Whiting et al., "Performance Results for Digital Subscriber Line Precoders," Alcatel-Lucent Technical Report, ITD-07-4768R, Apr. 2007, pp. 1-35.
U.S. Appl. No. 11/897,809, filed in the name of M. Guenach et al. on Aug. 31, 2007 and entitled "Determining Channel Matrices by Correlated Transmissions to Different Channels."
U.S. Appl. No. 11/897,877, filed in the name of G. Kramer et al. on Aug. 31, 2007 and entitled "Determining a Channel Matrix by Measuring Interference."

* cited by examiner

*Primary Examiner* — Huy Vu
*Assistant Examiner* — Maria Sekul
(74) *Attorney, Agent, or Firm* — Ryan, Mason & Lewis, LLP

(57) ABSTRACT

Techniques are disclosed for compensating for crosstalk using adaptation of data signals transmitted over respective channels of a communication system. For example, a method includes the following steps. A first set of estimated measures of crosstalk is obtained for at least a selected portion of a plurality of communication channels over which data signals are to be transmitted from a transmitter to at least a selected portion of a plurality of receivers. A first set of data signals based on the first set of estimated measures of crosstalk is adapted to generate a first set of adjusted data signals. The first set of adjusted data signals is transmitted to corresponding ones of the plurality of receivers. A second set of estimated measures of crosstalk is obtained for the selected portion of the plurality of communication channels. A second set of data signals for transmission based on the second set of estimated measures of crosstalk is adapted to generate a second set of adjusted data signals. Iteration of the obtaining, adjusting and transmitting steps is performed so as to reduce an error between subsequent estimated measures of crosstalk and actual measures of crosstalk for the plurality of communication channels.

24 Claims, 5 Drawing Sheets

| ITEM | VALUE |
|---|---|
| # LINES | 5 |
| Δ | $\sqrt{0.3N}$ |
| SINR REQUESTS PER STEP | 3 |
| PRECODING | IDEAL (50 dB) |
| CROSSTALK POWER NEW LINE | −10 dB |
| CROSSTALK POWER INITIAL ESTIMATE | −20 dB | ns.

METHOD AND APPARATUS FOR SELF-TUNING PRECODER

CROSS REFERENCE TO RELATED APPLICATIONS

The present application is related to the U.S. patent applications respectively identified as U.S. Ser. No. 11/897,877 and entitled "Determining a Channel Matrix by Measuring Interference") and U.S. Ser. No. 11/897,809 and entitled "Determining Channel Matrices by Correlated Transmissions to Different Channels"), both concurrently filed herewith on Aug. 31, 2007, the disclosures of which are incorporated by reference herein.

FIELD OF THE INVENTION

The present invention relates generally to communication systems, and more particularly to techniques for compensating for crosstalk between communication channels in such systems.

BACKGROUND OF THE INVENTION

As is well known, a communication system may utilize multiple communication channels to communicate signals between transmitters and receivers of the system. For example, multiple channels may be used to separate different transmitted data signals from one another, or to provide an increased data rate.

A problem that can arise in multiple channel communication systems relates to crosstalk between the various channels, also referred to as inter-channel crosstalk. For example, in a typical digital subscriber line (DSL) system, each of the channels may comprise orthogonal frequency division multiplexed (OFDM) tones or discrete multitone modulation (DMT) tones transmitted over a physical communication link such as twisted-pair copper wire. A transmission on one subscriber line may be detected on other subscriber lines, leading to interference that can degrade the throughput performance of the system. More generally, a given "victim" channel may experience crosstalk from multiple "disturber" channels, again leading to undesirable interference.

A need exists for techniques that compensate for channel crosstalk in DSL systems and other communication systems that may include unsynchronized channels.

SUMMARY OF THE INVENTION

The present invention in one or more illustrative embodiments provides techniques for compensating for crosstalk using adaptation of data signals transmitted over respective channels of a communication system.

In one aspect of the invention, a method comprises the following steps. A first set of estimated measures of crosstalk is obtained for at least a selected portion of a plurality of communication channels over which data signals are to be transmitted from a transmitter to at least a selected portion of a plurality of receivers. A first set of data signals based on the first set of estimated measures of crosstalk is adapted to generate a first set of adjusted data signals. The first set of adjusted data signals is transmitted to corresponding ones of the plurality of receivers. A second set of estimated measures of crosstalk is obtained for the selected portion of the plurality of communication channels. A second set of data signals for transmission based on the second set of estimated measures of crosstalk is adapted to generate a second set of adjusted data signals. Iteration of the obtaining, adjusting and transmitting steps is performed so as to reduce an error between subsequent estimated measures of crosstalk and actual measures of crosstalk for the plurality of communication channels.

In one embodiment, the steps of adjusting the first set of data signals and the second set of data signals may each further comprise adapting a precoding matrix that comprises elements that are generated from the obtained set of estimated measures of crosstalk. The precoding matrix may be adapted by directly perturbing the precoding matrix or by perturbing estimates of crosstalk coefficients of the precoding matrix. Adaptation of the precoding matrix may further comprise updating an operating point of the precoding matrix based on the obtained set of estimated measures of crosstalk.

In another embodiment, the steps of adjusting the first set of data signals and the second set of data signals may each further comprise adding adjustment signals to corresponding ones of the data signals, wherein the adjustment signals are generated based on the obtained set of estimated measures of crosstalk.

In yet another embodiment, the steps of adjusting the first set of data signals and the second set of data signals may each further comprise iteratively setting power levels of corresponding ones of the data signals. A power level may be chosen according to estimates of the crosstalk estimate error or according to a distribution of the crosstalk estimate error.

Further, the first set of estimated measures of crosstalk and the second set of estimated measures of crosstalk are generated from signal-to-interference-plus-noise ratio (SINR) measurements received from the plurality of receivers. Still further, the set of estimated measures of crosstalk may be obtained by a difference estimation process. The difference estimation process may comprise adaptation of a perturbation size. Adaptation of the perturbation size may comprise choosing an initial size and then reducing the initial size by a fixed fraction, or selecting the perturbation size according to an estimated interference plus noise value.

Advantageously, the illustrative embodiments allow for self-tuning of a precoder in a communications system by iteratively reducing the error between estimated measures of crosstalk and actual measures of crosstalk. Furthermore, the disclosed techniques can be implemented in a wide variety of wired or wireless communication systems, including DSL systems and cellular systems.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be illustrated below in conjunction with exemplary communication systems and associated techniques for compensating for crosstalk between communication channels in such systems. It should be understood, however, that the invention is not limited to use with any particular type of communication system or channel crosstalk measurement application. The disclosed techniques are suitable for use with a wide variety of other communication systems, and in numerous alternative crosstalk measurement applications. For example, although illustrated below in the context of DSL systems based on OFDM, the disclosed techniques can be adapted in a straightforward manner to other types of wired or wireless communication systems, including cellular systems, multiple-input multiple-output (MIMO) systems, Wi-Fi or WiMax systems, etc.

Figure 1:
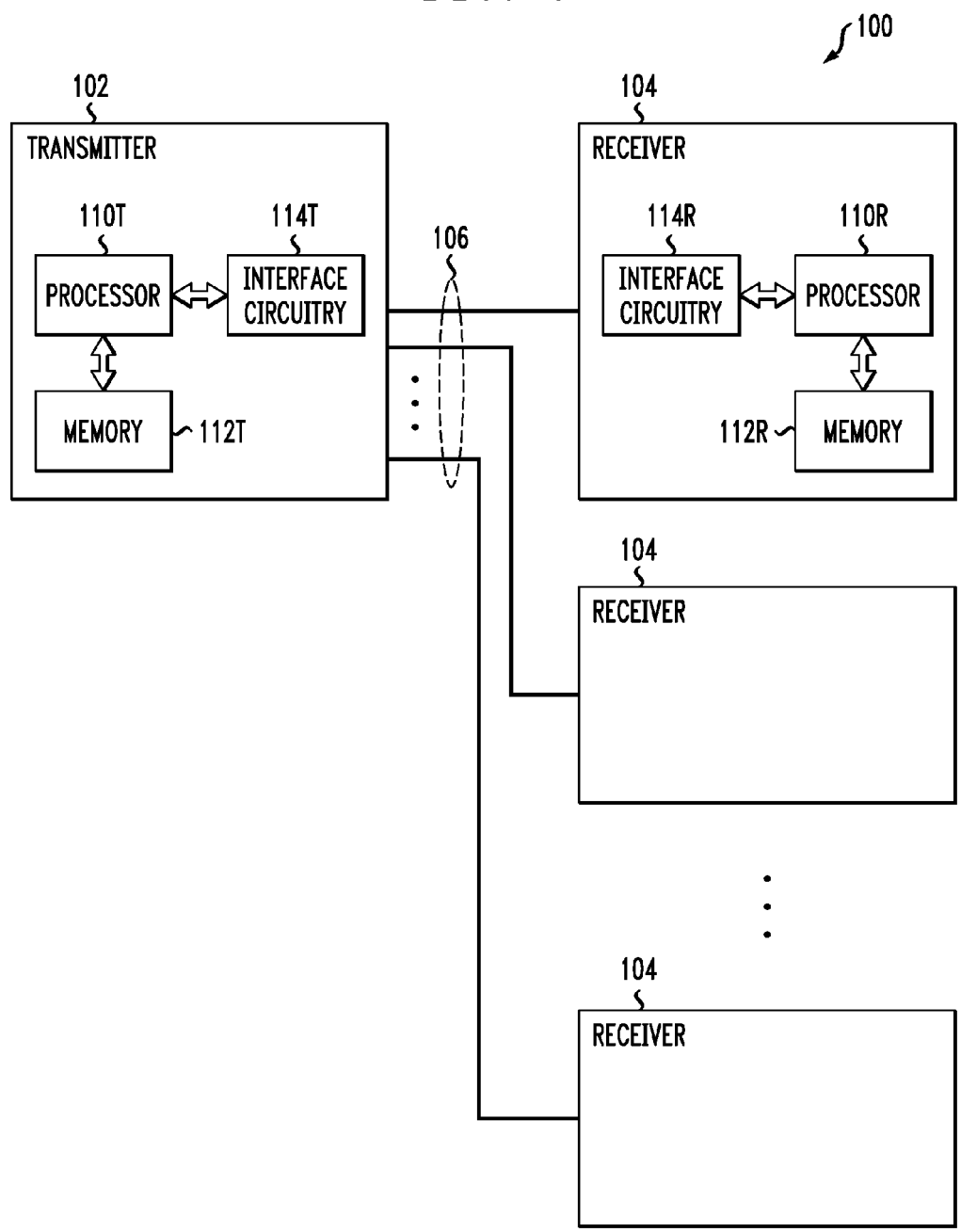
FIG. 1 illustrates a communication system according to an illustrative embodiment of the invention.

FIG. 1 shows a communication system 100 comprising a transmitter 102 that communicates with multiple receivers 104 over respective communication channels 106. The communication channels 106 may comprise wired channels or wireless channels. As shown in FIG. 1, the transmitter 102 comprises a processor 110T coupled to a memory 112T and interface circuitry 114T. Similarly, a given one of the receivers 104 comprises a processor 110R coupled to a memory 112R and interface circuitry 114R. The other receivers 104 are assumed to be configured in a similar manner.

Although a single transmitter is shown communicating with multiple receivers in the illustrative system 100, numerous other configurations are possible. For example, multiple transmitters may communicate with multiple receivers, or a single transmitter may communicate with a single receiver. The terms "transmitter" and "receiver" as used herein are intended to be construed generally, so as to encompass single respective transmitter and receiver elements as well as combinations of multiple respective transmitter and receiver elements. Also, the transmitter 102 may comprise multiple separate transmitters, for example, in the case of a central office in a DSL system, or a base station in a cellular system.

Moreover, a given communication device of the type shown in the figure may function as both a receiver and a transmitter. Thus, elements 102 and 104 of system 100, although characterized as respective transmitter and receiver elements for purposes of illustration, may each comprise transceiver circuitry and be operative to function as both a transmitter and a receiver. The crosstalk compensation techniques disclosed herein may therefore be applied to transmissions from an element 104 to the element 102. Elements 102 and 104 may comprise or be incorporated into respective processing devices of a communication system, such as modems, computers or other communication devices. Numerous such devices are well known to those skilled in the art and are therefore not further described herein.

Software programs for compensation of crosstalk and performance of associated transmitter and receiver signal processing operations in the system 100 may be stored in the memories 112 and executed by the processors 110. The transmitter 102 and receivers 104 may each comprise multiple integrated circuits, digital signal processors or other types of processing devices, and associated supporting circuitry, in any combination, using well-known conventional arrangements. Of course, numerous alternative arrangements of hardware, software or firmware in any combination may be utilized in implementing the transmitter 102 and receivers 104 or particular portions thereof.

The system 100 as shown in the figure may be viewed as being representative of any of a number of different types of communication systems. By way of example, the system 100 may comprise a DSL system in which data is transmitted using OFDM tones. Conventional aspects of such systems are well known and therefore not described in detail herein. Inter-channel crosstalk in a DSL system using OFDM may comprise, for example, far-end crosstalk (FEXT), although the disclosed techniques are more generally applicable to a wide variety of other types of crosstalk. Because the OFDM tones are typically relatively narrow with respect to the total frequency spectrum used, the impact at a particular frequency may be modeled as a single complex coefficient h denoting the crosstalk into a given "victim" subscriber line from a given "disturber" subscriber line at a given tone index. The amplitude of the coefficient represents the change in scale for the corresponding OFDM carrier whereas the phase of the coefficient represents the change in phase for that carrier.

The crosstalk between the multiple communication channels 106 over which transmitter 102 communicates with receivers 104 in the system 100 may be compensated using an approach referred to as precoding, also known as precompensation. In one precompensation approach, crosstalk measures determined by the receivers and communicated to the transmitter are used to determine coefficients of a channel matrix. Effective precoding generally requires accurate channel gain and phase information. For example, using a linear crosstalk model to characterize N channels, an N×N channel matrix may be generated, with the off-diagonal elements of the matrix representing the above-noted complex coefficients characterizing the inter-channel crosstalk. The precoding may be applied in the transmitter using a linear zero-forcing digital filter (or precoder) that receives as its inputs a vector of data signals to be transmitted and the above-noted channel matrix and generates therefrom a vector of compensated data signals.

Another application in which measures of inter-channel crosstalk may be used is in managing the various channels of the system. For example, such measures may be used to determine an optimum allocation of power or other resources among the channels or to provide stability of channel bit rates. In the DSL context, this may involve utilizing the measures to improve dynamic spectrum management (DSM) level 2 power assignments or stability algorithms, thereby facilitating the maintenance of a declared bit rate for a given line. These and other resource allocation applications typically require less accurate estimates, and hence may not need channel phase information.

The transmitter 102 and receivers 104 of system 100 in FIG. 1 are advantageously configured such that estimates or other measures of inter-channel crosstalk may be generated in an accurate and efficient manner. Such crosstalk measures may be returned from the receivers 104 to the transmitter 102 for use in applications such as precoding or resource allocation of the type described above. The measures may comprise, for example, impulse response coefficients characterizing the crosstalk. Alternatively, measures generated by the receivers may be returned to the transmitter and further processed there to obtain impulse response coefficients.

In accordance with an illustrative embodiment, a technique for compensating for crosstalk in accordance with a precoding architecture embodying illustrative principles of the invention will now be described. By way of example, such a precoding architecture can be implemented in transmitter 102 of the communication system of FIG. 1.

It is to be understood a so-called "inverse precoder" is being used on a given tone f to precode the digital samples (data signals) being output to the DSL lines (channels). There are L lines. We will further assume equal transmitted powers $P_k = P$, $k=1, \ldots, L$ unless otherwise stated. The channel between the CO (central office) and the receivers is given by $y = Hx + z$, where H is an N×N matrix of complex coefficients and z is zero mean complex Gaussian noise. The components of x are data signals, pilot signals, or sums of data signals and pilot signals. The channel matrix, H, can be written as:

$$H = D(I+G) \quad (1)$$

where D is the diagonal matrix of direct gains and G is the relative crosstalk matrix, which has zeros on the main diagonal. The precoding matrix C is constructed using G, a matrix of $$\begin{aligned} C &= (I + \hat{G})^{-1} \\ &= I - \hat{G} + \hat{G}^2 - \hat{G}^3 + \ldots \\ &= I - \tilde{G} \end{aligned} \quad (2)$$

where the last equality forms the definition for $\tilde{G}$. Finally, we may define the error matrix to be $\Delta$, which is defined as:

$$\Delta = \hat{G} - G \quad (3)$$

Additionally, given a victim line v, we denote the error vector of crosstalk estimates as:

$$\theta_{vk} = -\Delta_{vk} = g_{vk} - \hat{g}_{vk}.$$

$$\theta_k = -(\Delta_{vk})_{v \neq k} \quad (4)$$

where $\theta_k$ is a row vector.

We now consider the overall channel with precoding, this is:

$$y = HCx + z \quad (5)$$

which normalized to the direct channel is:

$$\tilde{y} = D^{-1} y = (I+G)Cx + \tilde{z} \quad (6)$$

The normalized matrix:

$$\begin{aligned} R &= (I+G)C \\ &= (I + \hat{G} - \Delta)(I - \tilde{G}) \\ &= I - \Delta + \Delta \tilde{G} \end{aligned} \quad (7)$$

we term the resultant channel matrix. The channel thus becomes:

$$\tilde{y} = Rx + \tilde{z}$$

Write $$b_v = R_{vv} x_v$$

and suppose that $E[|x_v|^2] = 1$. The total desired signal power received on line v is:

$$E[|b_v|^2] = |R_{vv}|^2 = 1 + \theta_v \tilde{g}_v \tilde{g}_v^\dagger \theta_v^\dagger - 2 \Re(\theta_v \tilde{g}_v) \quad (8)$$

where $\tilde{g}_v$ corresponds to the vth column of $\tilde{G}$ but with the term $\tilde{G}_{vv}$ omitted as $\Delta_{vv} = 0$. Thus, because $\theta_v$ and $\tilde{g}_v$ are small, we see that errors in the precoder matrix contribute to (usually) small changes in the received power.

If the elements of $\tilde{G}$ satisfy $\tilde{g}_{jk} \ll 1$, then we obtain the approximation:

$$R \approx I - \Delta$$

so that the average signal-to-interference-plus-noise ratio (SINR) for a victim line v can be approximated as:

$$\gamma_v \approx \frac{1}{\sum_{k \neq v} |g_{vk} - \hat{g}_{vk}|^2 + \tilde{N}}$$

for the tone under consideration. This approximation is often used in modeling precoder performance.

There are a number of possible ways in which SINR can be measured. Of course to a large extent these measurements will give similar values when actually employed. For the sake of clarity, however, we examine multiple definitions and note that various DSL modems may use different methods to estimate SINR. Thus, it is to be understood that the crosstalk compensation techniques of the invention are not limited to the use of any particular SINR measurement method.

We now describe in detail, two methods by which the SINR $\gamma$ for a given victim line v can be estimated. The first method we refer to as the indirect method. We will assume that the direct channel gain $h_d$ is known accurately at the receiver and that the received power is computed using this estimate. It therefore remains to estimate the sum power of interference and noise, $I + \tilde{N}$.

The interference is estimated as follows. First, the desired signal $x_{v(t)}$ at time $t$, $t = 1, \ldots,$ is decoded, which with very high probability will be correct. We therefore neglect estimation errors arising from incorrect decoding. Second, the desired signal is subtracted from the overall received signal using the direct gain and the average squared amplitude of the remaining signal is obtained, yielding:

$$\gamma = \frac{T |h_d|^2}{\sum_t |y_t - h_d x_{v(t)}|^2} \quad (9)$$

where T is the number of received symbols used in making the estimate. We assume that T is greater or equal to 256 but the actual number used may vary from modem to modem. It may also be reasonable to assume that individual modems use a fixed value.

For convenience, we suppress the subscript v of $\theta_{vk}$ and $\theta_v$ and write these variables as $\theta_k$ and $\theta$, respectively. We now determine the expectation of the reciprocal SINR for the indirect method. After canceling the desired, decoded signal and normalizing we obtain:

$$\begin{aligned} \tau_v &= \sum_k R_{vk} x_k + z_v - x_v \\ &= \left(\sum_{k \neq v} \Delta_{vk} \tilde{G}_{kv}\right) x_v + \sum_{k \neq v} \left[\sum_{\ell \neq v} \Delta_{v\ell} \tilde{G}_{\ell k} - \Delta_{vk}\right] x_k + z_v \\ &= -\left(\sum_{k \neq v} \theta_k \tilde{G}_{kv}\right) x_v + \sum_{k \neq v} \left[\theta_k - \sum_{\ell \neq v} \theta_\ell \tilde{G}_{\ell k}\right] x_k + z_v \end{aligned} \quad (10)$$

Expectation is taken over the signal ensemble and the noise, which are mutually independent so that:

$$E[|\tau_v|^2] = |\theta \tilde{g}_v|^2 + \sum_{k \neq v}\left|\theta_k - \sum_{\ell \neq v}\theta_\ell \tilde{G}_{\ell k}\right|^2 + \tilde{N} \quad (11)$$

where by assumption $E[|x|^2]1$.

If $u=\theta A$ where u, $\theta$ are complex row vectors and A is a complex square matrix then:

$$\|u\|^2 = \theta A A^\dagger \theta^\dagger$$

Hence we may write:

$$\overline{\gamma^{-1}} = \theta G^c \theta^\dagger + \tilde{N} \quad (12)$$

where:

$$G^c = (I-\tilde{G}_v)(I-\tilde{G}_v)^\dagger + \tilde{g}_v \tilde{g}_v^\dagger \quad (13)$$

First note that $G^c$ is a known matrix as it is derived from $\hat{G}$, it is Hermitian and positive definite. Equation (12) shows that under this method of estimation, an ideal setting of the precoder can be performed by minimizing a quadratic expression for the error in the relative crosstalk coefficients. For future reference, we define:

$$I(\theta) = \theta G^c \theta^\dagger \quad (14)$$

We now describe a second method of estimating the SINK which we term the direct method. Under this approach, the direct gain is not supplied. As before the data is decoded. However we then measure the desired signal power directly. Assuming there is no bias, the estimated average signal power will have a mean as given in equation (8).

In place of an independent pilot based estimate for the direct channel, we use:

$$y = h_v x + w \quad (15)$$

where all vectors have T components, $h_v$ is the direct channel taking into account the effect of precoding and w includes crosstalk interference and noise. Normalized to the actual direct gain $h_d$, we have:

$$|h_v|^2 = 1 + \theta_v \tilde{g}_v \tilde{g}_v^\dagger \theta_v^\dagger - 2\Re(\theta_v \tilde{g}_v) \quad (16)$$

$h_v$ can be estimated as:

$$\hat{h}_v = \frac{x^\dagger y}{\|x\|^2} \quad (17)$$

which has mean $h_v$ and variance $\sigma_w^2/\|X\|^2$. The residual noise and interference is thus obtained as:

$$\|y - \hat{h}_v x\|^2 \quad (18)$$

The SINR is thus obtained as:

$$\gamma = \frac{|\hat{h}_v|^2 \|x\|^2}{\|y - \hat{h}_v x\|^2} \quad (19)$$

Given the above illustrative principles, we now describe one embodiment of a precoding methodology according to the invention.

Figure 2:
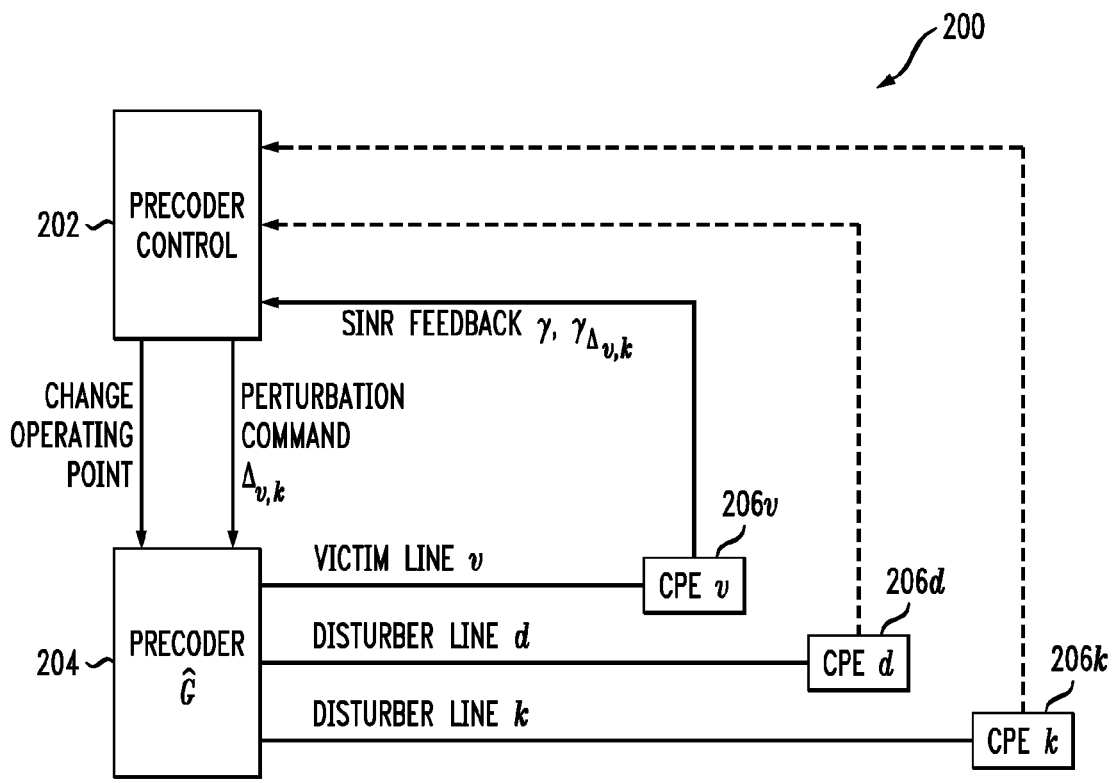
FIG. 2 illustrates a precoding architecture used to compensate crosstalk according to an illustrative embodiment of the invention.

FIG. 2 illustrates a self-tuning precoding architecture using a difference mode of operation for some given tone f. It is to be understood that such precoding architecture can be implemented in transmitter 102 of the communication system of FIG. 1. As shown, precoding architecture 200 includes precoder control 202 and precoder 204. As will be explained, the precoder control and precoder blocks are operatively coupled to customer premises equipment (CPE) 206 v, d and k, each of which may comprise a modem, a computer or other communication device. More particularly, FIG. 2 illustrates a self-tuning precoder architecture that uses perturbation based estimates to cancel crosstalk on victim line v from disturber lines (as shown, currently estimating from line k).

It is to be appreciated that the current state of the matrix in precoder 204 (i.e., the precoder matrix) is determined by $\hat{G}$, the matrix of relative crosstalk estimates which is used to derive the matrix filter. As can be seen, SINR estimates $\gamma_{\Delta_{v,k}}$ are being provided by the customer premises equipment (CPE) v before perturbation $\gamma$ and after a perturbation made for disturbing line k. This feedback is provided to precoder control 202 which also issues commands for the perturbations $\Delta_{v,k}$ in the precoder matrix. Such commands are made taking into account not only the impact on the line of interest v but also the impact on other lines.

Additionally precoder control 202 sends commands to change to a new operating point for precoder 204 (update precoding matrix) according to error estimates as detailed below. As mentioned, precoder 204 is at the transmitter which, in some cases, may be at the customer's telephone exchange (central office or CO). Precoder control 202 may also be located there, but this is not necessary.

To completely define the control loop, the way in which the SINR is estimated should be given. In the following, we will assume that independent pilot estimates are used to measure the direct channel. Furthermore, we will assume that the total interference plus noise power is measured by removing the direct signal from the total signal using these direct channel gain estimates. Any differences in the actual direct signal from this estimate are thus included in interference. Other forms of SINR estimation can and might be used and the methods here can be adapted in a straightforward manner.

The current unknown operating error is $\theta^*$ and the current relative crosstalk estimate is $g^*$. The goal of the difference estimation operation performed by precoder control 202 is to estimate this error, correct $g^*$ and so reduce the crosstalk interference:

$$\theta^* = g - g^* \quad (20)$$

The error estimate $\hat{\theta}^*$ is used to correct the crosstalk coefficients as in:

$$\hat{g} = \hat{\theta}^* + g \quad (21)$$

These error estimates are obtained by using the measured changes in interference I which are the reciprocal of the SINR measurements. These lead to the following sequence of random variables:

$$y_k^t = \frac{I_{\Delta_k}^t - I^t - |\Delta_k|^2 G_{k,k}^c}{2|\Delta_k|} \quad (22)$$

These result from the perturbations $\Delta_k$ (which are different than the error values $\Delta$ above)

$$g^* - \Delta_k E_k$$

where $e_k$ is a column vector with a one in component k and zero otherwise. The perturbation values $\Delta_k$ are either purely real or purely imaginary. Furthermore, $I_{\Delta k}^t$, $I_k^t$ are the reciprocal, normalized SINR values after and before perturbation on line k, respectively, and they are taken at step t.

Taking expectations, we find that:

$$E[y^\dagger] = -G^c \theta^{*\dagger} \quad (23)$$

for each vector of samples. In addition, for each fixed k the $y_k^1$ have a common variance:

$$\mathrm{Var}[y_k^t] = \frac{\sigma_I^2 + \sigma_{I+\Delta_k}^2}{4T|\Delta_k|^2} \quad (24)$$

where $\sigma_1^2$ and $\sigma_{1+\Delta_k}^2$ are the per (OFDM) symbol variances of the total interference plus noise with no perturbation and with a perturbation $\Delta_k$, respectively.

The vector of estimates y can be represented as independent complex normal random variables with unknown means and variances, inversely proportional to the squared magnitude of the perturbations, which we take as having a common value. The value of the mean does not depend on the size of the perturbations. For each real and each imaginary perturbation there are a total of M estimates so that there are 3M (L−1) SINR measurements at each adaptive step. However, alternatively, we might take only one set of M interference measurements at the operating point for all the lines and then obtain the SINR measurements for the perturbed case.

The sample mean and sample variance of the estimators y are obtained for all selected lines for the given measurement period. The mean values over the disturbing lines are used to directly estimate the error:

$$G^c \hat{\theta}^{*\dagger} = -\bar{y}^\dagger \quad (25)$$

as the solution to the above set of linear equations. We now define the centered random variables $\xi$ as:

$$\begin{aligned} \xi &= -\bar{y} - \theta^* G^c \\ &= (\hat{\theta}^* - \theta^*) G^c \\ &= -\hat{\theta} G^c \end{aligned} \quad (26)$$

from which we find that:

$$\xi G^{c-1} \xi^\dagger = \hat{\theta} G^c \hat{\theta}^\dagger = I(\hat{\theta}) \quad (27)$$

Thus, we have the distribution of the interference after updating, in terms of the centered estimates. The new error:

$$\hat{\theta} = g - \hat{g} = \theta^* - \hat{\theta}^*$$

is unbiased for the true error because of the consistency between the difference estimate and the underlying derivatives.

A target set for the precoder architecture can be specified. One choice is to reduce the mean crosstalk interference to within some factor of the background noise and interference βN. Note we only choose β and therefore we do not need to know N to set the target. The design problem can be reduced into two parts. The first part is that of setting or adapting Δ so as to get an expectation which is demonstrably smaller than α times the current interference. The second part is to choose α and with it the sample size $M_\alpha$ which will drive the precoding process. Once α has been set, we can either work with fixed Δ or adapt it and similarly for $M_\alpha$. α will typically lie in (0, 1). $M_\alpha$ could be units, tens or hundreds, however, it is preferred that $M_\alpha$ be small, i.e., units.

Figure 3:
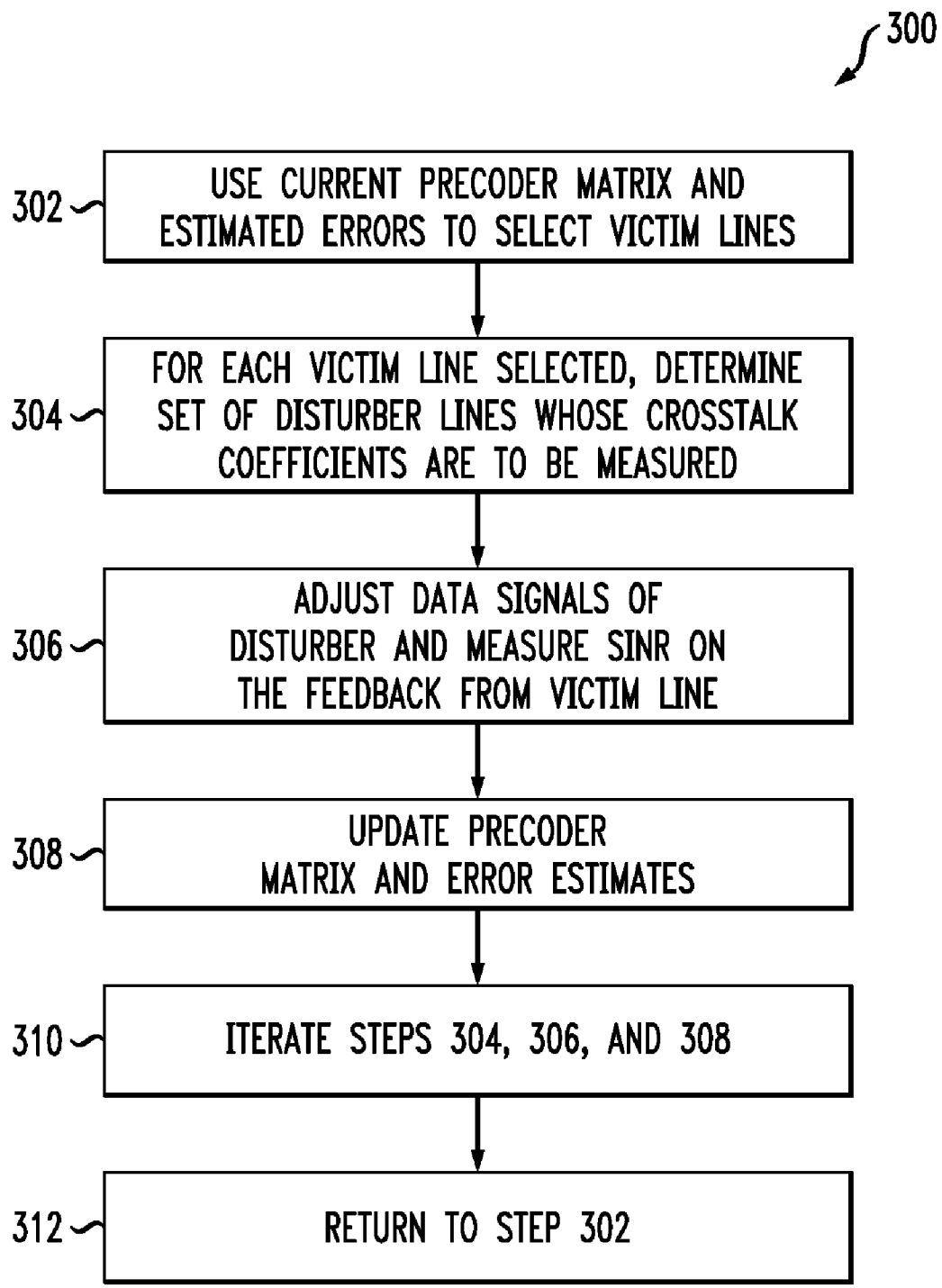
FIG. 3 illustrates a precoding methodology used to compensate crosstalk according to an illustrative embodiment of the invention.

We now describe an exemplary algorithm in the context of FIG. 3 for tuning a precoder which employs the above principles. It is to be understood that the tracking phase involves a reduction in the perturbation size together with the weighting of crosstalk estimates over time. The self-tuning precoder goes through the following steps of methodology 300. We describe a single iteration only and note that these steps are performed repeatedly.

Step 302. Use the current precoder matrix and estimated errors to select victim lines.

Step 304. For each victim line, determine the set of disturbers whose crosstalk coefficients are to be measured.

Step 306. Adjust data signals of the disturbing lines and measure the SINR on the feedback from the victim lines.

Step 308. Update precoder matrix and error estimates.

Step 310. Iterate steps 304, 306 and 308.

Step 312. Go to step 302.

In step 302, the task is to determine the set of victim lines on each tone to be adapted. This set is determined by considerations such as:

a) Overall line rate requirements;
b) Bounds on maximum SINR for each given line and tone; and
c) Current SINR by line and tone.
d) Computational capabilities of the transmitter Resulting from step 302 is a list of victim lines for each tone and there may also be SINR targets supplied for each tone in addition.

In step 304, the disturbers on each tone which contribute most significantly to crosstalk are identified. This is done using the current error estimates for θ for each given victim line v. Also, at this stage, groups of disturbers are identified which may be perturbed simultaneously. The current overall precoder matrix Ĝ is used to determine these groups and they are chosen so that the perturbations for one disturber do not significantly impact measurement for another. One disturber per victim is the preferred mode of operation although distinct victim lines may use perturbations from a common disturber. Estimates are drawn for the group of victim lines simultaneously. Once a stage of estimation and adaptation is completed for one group, an additional group is addressed.

Steps 306 and 308 have been described in detail above. However, we emphasize that multiple iterations are taken so that the benefits of interference reduction can be fed forward into future estimation steps. That is, step 310 represents the fact that steps 304, 306 and 308 are iterated for each victim line identified in step 302. Then, step 312 indicates a return to step 302 so that a new set of victim lines may be identified and steps 304 through 320 performed for those lines.

Second, the choices taken at step 304 imply that the objective matrix can be treated as being fixed for each victim line as far as measurement and adaptation is concerned. Apart from the new operating relative crosstalk matrix, this stage also yields new estimates for the magnitude of the error θ for the just measured crosstalk coefficients. Finally, it is to be appreciated that the number of samples $M_\alpha$ need not be fixed in advance and can be adapted as the error variances for the SINR are sampled.

We now discuss an embodiment wherein adjustment of the data signals includes the adding of adjustment (pilot) signals to corresponding ones of the data signals.

Consider the problem of a single joining line to a group of lines which are already being ideally precoded. The problem is to acquire the crosstalk coefficient of the new joining line as a disturber for each of the active lines and this must be accomplished rapidly. This problem is constrained by the requirement that the interference from the new line should not cause the SINR of the active lines to fall by a significant amount. This means the power must be progressively increased.

In accordance with this illustrative preceding embodiment, pilot signals can be used to estimate the crosstalk coefficient for each of the active lines. The estimate can then be used to update the precoding matrix.

However, the methods of the precoder tuner provide the rules by which both the initial and subsequent power levels should be set so as to update the precoder in an efficient, i.e., rapid, manner with controlled impact on the victim (active) lines.

Figures 4, 5:
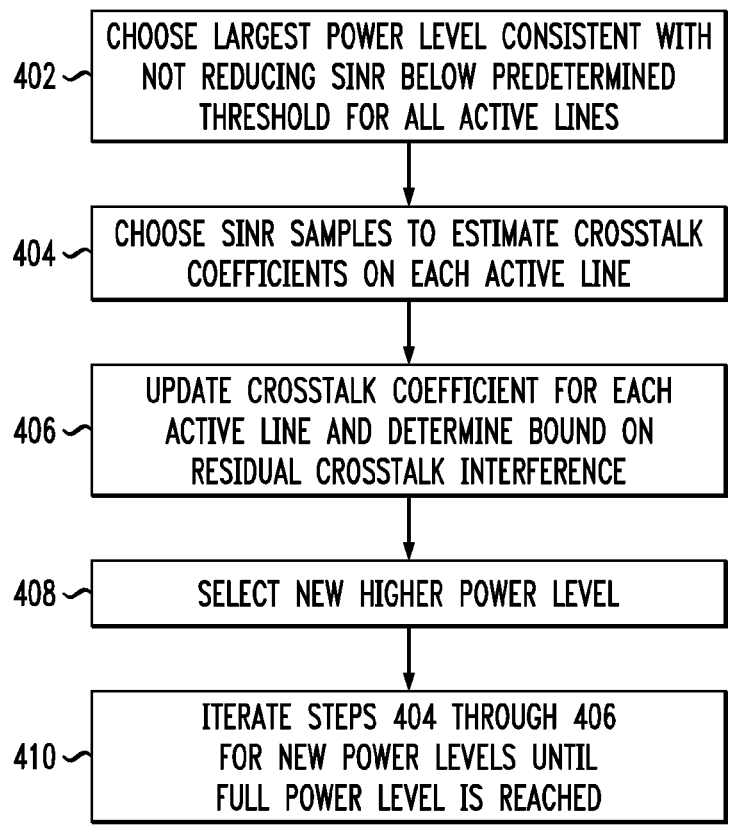
FIG. 4 illustrates a precoding methodology used to compensate crosstalk according to another illustrative embodiment of the invention.
FIG. 5 illustrates a table indicating a set-up for an illustrative implementation of a precoding methodology used to compensate crosstalk according to an illustrative embodiment of the invention.

The method is as follows described in the context of methodology 400 of FIG. 4.

First, in step 402, we choose the largest power level consistent with not reducing the SINR below some predetermined threshold for all the active lines. Hence, we choose according to worst case crosstalk or bound on that over the active lines; alternatively, according to initial estimates if we have them.

Then we iterate:

In step 404, choose a number of SINR samples to estimate crosstalk coefficients on each of the lines and with perturbation using, for example, square root of N, where N is background noise or some scaled value of same.

In step 406, update the crosstalk coefficient for each line and determine bound on $R_k$ which is the residual crosstalk interference on line k after correction with the new crosstalk estimate.

Let $B_k$ be a bounding random variable for $R_k$ with known parameters for $B_k$. This could be $R_k$ itself if its probability distribution is known.

In step 408, select a new higher power level as large as possible consistent with the bounding random variables $B_k$. On the active lines, we permit acceptable levels of crosstalk interference, acceptable being defined stochastically.

In step 410, go to step 404, and repeat until full power level is reached on the joining line.

This method can be optimized with the objective being to get to full power in the shortest number of steps. For example, optimization may be realized by more estimates at step 404 and larger power increases versus fewer estimates at step 404 and smaller power increases.

We now provide numerical experiment results for the SINR performance of an active line in response to the action of a new joining line. The set up is summarized in the table of FIG. 5. As can be seen, there are five lines which we assume are being precoded. The first four of these lines are ideally precoded while the crosstalk of a joining fifth line is being partially cancelled only. The power of the crosstalking signal of the fifth line without any precoding is −10 dB. However, we assume that an initial crosstalk estimate has been used so that the actual residual crosstalk power is −20 dB on the new active line, if the new disturbing line is operating at full power. Δ denotes the perturbation size used in acquiring the crosstalk coefficient of the joining line. $\Delta^2$ is on the order of the background noise plus interference $N=10^{-5}$, so that the impact of perturbations is a small number of dB's loss. Finally, the effect of quantization to 0.5 dB is included.

However, a crosstalking power of −20 dB is unacceptable when the lines are operating ideally (in practice close to ideally) at an SINR of 50 dB. For this reason, the power of the joining line starts with low power level to limit its crosstalk interference and its power is built up in a small number of steps. This allows near ideal performance to be maintained while the active line acquires the crosstalk coefficient of the joining line. Several active lines may go through the joining process in parallel and the choice of power levels depends on the largest of the residual crosstalk powers.

Figure 6:
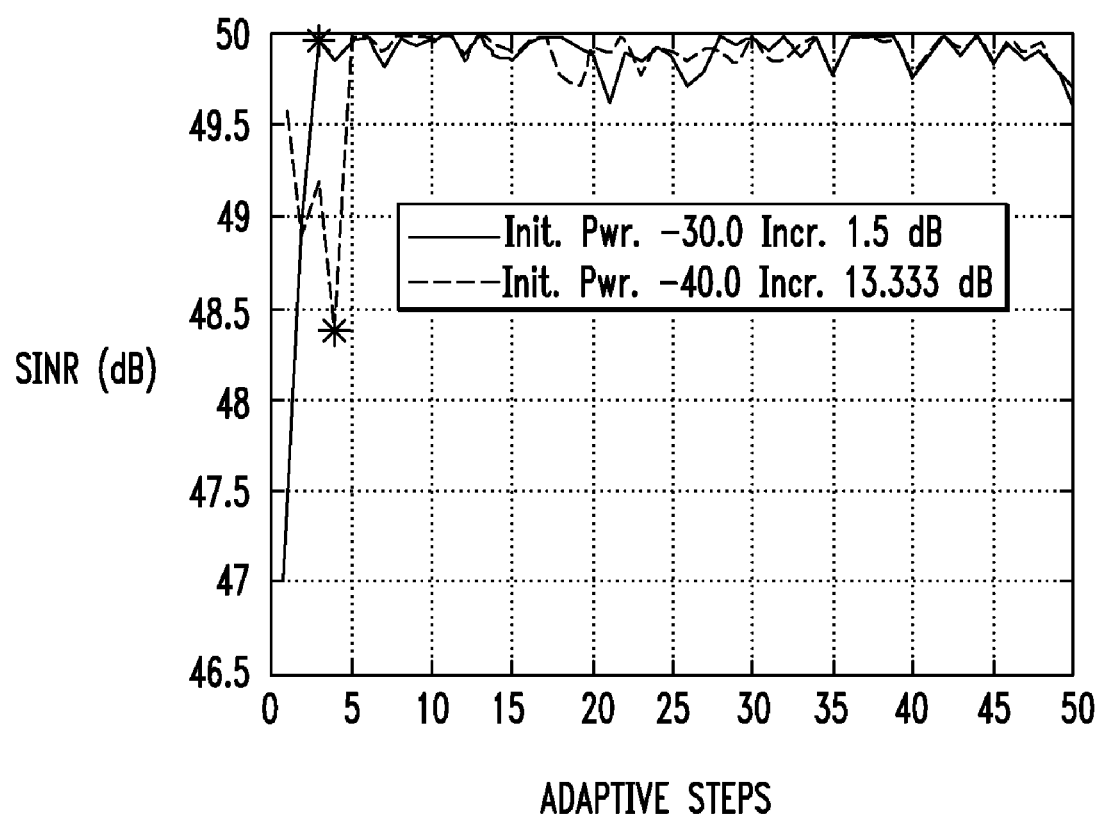
FIG. 6 illustrates results of the illustrative implementation of FIG. 4.

FIG. 6 depicts two instances of this approach with results for the same active and new joining line. The solid curve is the first instance and shows that with the joining power level at −30 dB initially, the SINR drops by around 3 dB so that the crosstalking signal, at full power offset, is comparable to the noise. The last power increment took place prior to the SINR report at the star, which is therefore after two adaptive steps for a total of six SINR requests.

The second dashed curve shows the second instance where the joining power level is smaller at −40 dB, the offset power is higher and the increment is smaller per adaptive steps. Thus, the initial SINR prior to acquisition is higher. Moreover, in this instance, there were three adaptive steps prior to the SINR report at the star, for a total of nine SINR requests.

A comparison of the two curves shows that the SINR deteriorates by about 1.0 dB in the second instance, showing that the coefficient is not being acquired quite as effectively as in the first case. This is explicable by the lower joining power and therefore more difficult to measure crosstalk at the initial stage.

It should be noted however that the perturbations used in measuring the crosstalk coefficients themselves induced an SINR loss of around 3 dB in both cases. Taking this into account, the second line actually did not add to the SINR losses which would be part of routine tracking.

Finally, note that there is always a tradeoff to be struck between the degree of offset used and the power increments versus the time to acquire the crosstalk coefficient. The results show that the crosstalk coefficients can be acquired in a few tens of seconds depending mainly on the time between SINR requests and the reports being returned.

While various illustrative embodiments of the principles of the invention are described above, it is to be understood that various other alternative implementations may be realized in a straightforward manner.

By way of example only, a regression based hill climbing method may be employed. This method relies on representing the interference as a quadratic function of the error θ in the crosstalk coefficients. The unknown coefficients of the quadratic can be estimated by using SINR estimates at various choices of operating point (settings of the precoder matrix). By using regression, theses estimates can be used to fix the quadratic. The fitted quadratic can then be used to determine the optimum operating point for the precoder.

By way of further example, a direct adaptation of the precoder matrix may be performed. That is, the precoder can also be tuned by directly perturbing the precoder matrix itself as opposed to the estimates of the crosstalk coefficients ĝ. Let $C_j$ denote column j of the precoder matrix. Thus, the resultant channel is:

$$\tilde{h}_{ij} = \sum_k A_{ik} C_{kj} = C_{ij} + \sum_{k \neq i} G_{ik} C_{kj} \qquad (28)$$

where A=I+G and G is the true relative crosstalk. In the case where the direct gain satisfies $|\tilde{h}_{ii}| \approx 1$, we may then write:

$$SINR_i = \frac{1}{\sum_j f_j(C_j) + N'} \qquad (29)$$

where $f_j$ is used to determine the interference as a function of the preorder matrix column $C_j$. Thus, the SINR can be maximized by minimizing each $f_j$ in turn, with the effects of the column decoupled. One way to do this is to use a multi-variate optimization method such as Powell's line search technique as disclosed in W. Press et al., "Numerical Recipes in C: The Art of Scientific Computing," Cambridge University Press, 1992. However, other appropriate techniques may be used.

It is to be appreciated that the self-tuning precoder techniques described herein may be employed with one or more of the channel estimate techniques disclosed in the concurrently filed U.S. patent applications respectively identified by (entitled "Determining a Channel Matrix by Measuring Interference") and (entitled "Determining Channel Matrices by Correlated Transmissions to Different Channels"), the disclosures of which are incorporated by reference herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   obtaining a first set of estimated crosstalk coefficients for at least a selected portion of a plurality of communication channels over which signals are to be transmitted from a transmitter to at least a selected portion of a plurality of receivers;
   adjusting a first set of signals based on the first set of estimated crosstalk coefficients to generate a first set of adjusted signals;
   transmitting the first set of adjusted signals to corresponding ones of the plurality of receivers;
   obtaining a second set of estimated crosstalk coefficients for the selected portion of the plurality of communication channels; and
   adjusting a second set of signals for transmission based on the second set of estimated crosstalk coefficients to generate a second set of adjusted signals;
   wherein iteration of the obtaining, adjusting and transmitting steps is performed so as to reduce an error between subsequent estimated crosstalk coefficients and actual crosstalk coefficients for the plurality of communication channels;
   wherein the steps of adjusting the first set of signals and the second set of signals each further comprise iteratively setting power levels of corresponding ones of the signals; and
   wherein a power level is chosen according to a distribution of the error between subsequent estimated crosstalk coefficients and actual crosstalk coefficients.

2. The method of claim 1, wherein the steps of adjusting the first set of signals and the second set of signals each further comprise adapting a precoding matrix that comprises elements that are generated from the obtained set of estimated crosstalk coefficients.

3. The method of claim 2, wherein the step of adapting the precoding matrix further comprises directly perturbing the precoding matrix.

4. The method of claim 2, wherein the step of adapting the precoding matrix further comprises perturbing estimates of crosstalk coefficients of the precoding matrix.

5. The method of claim 2, wherein the step of adapting the precoding matrix further comprises updating an operating point of the precoding matrix based on the obtained set of estimated crosstalk coefficients.

6. The method of claim 1, wherein the steps of adjusting the first set of signals and the second set of signals each further comprise adding adjustment signals to corresponding ones of the signals, wherein the adjustment signals are generated based on the obtained set of estimated crosstalk coefficients.

7. The method of claim 1, wherein the power level is chosen according to estimates of the error.

8. The method of claim 1, wherein the first set of estimated crosstalk coefficients and the second set of estimated crosstalk coefficients are generated from signal-interference-plus-noise ratio (SINR) measurements received from the plurality of receivers.

9. The method of claim 1, wherein the first set of signals and the second set of signals to be adjusted are selected based on a determination that corresponding channels over which the signals are to be transmitted are disturbing at least one other channel.

10. The method of claim 1, wherein the set of estimated crosstalk coefficients is obtained by a difference estimation process.

11. The method of claim 10, wherein the difference estimation process comprises adaptation of a perturbation size.

12. The method of claim 11, wherein adaptation of the perturbation size comprises choosing an initial size and then reducing the initial size by a fixed fraction.

13. The method of claim 11, wherein adaptation of the perturbation size comprises selecting the perturbation size according to an estimated interference plus noise value.

14. An article of manufacture comprising a processor-readable storage medium storing one or more software programs which when executed by a processor cause performance of the steps of the method of claim 1.

15. Apparatus comprising:
   a transmitter configured to obtain a first set of estimated crosstalk coefficients for at least a selected portion of a plurality of communication channels over which signals are to be transmitted from a transmitter to at least a selected portion of a plurality of receivers, adjust a first set of signals based on the first set of estimated crosstalk coefficients to generate a first set of adjusted signals, transmit the first set of adjusted signals to corresponding ones of the plurality of receivers, obtain a second set of estimated crosstalk coefficients for the selected portion of the plurality of communication channels, and adjust a second set of signals for transmission based on the second set of estimated crosstalk coefficients to generate a second set of adjusted signals, wherein iteration of the obtaining, adjusting and transmitting steps is performed so as to reduce an error between subsequent estimated crosstalk coefficients and actual crosstalk coefficients for the plurality of communication channels, wherein the steps of adjusting the first set of signals and the second set of signals each further comprise iteratively setting power levels of corresponding ones of the signals, and wherein a power level is chosen according to a distribution of the error between subsequent estimated crosstalk coefficients and actual crosstalk coefficients.

16. The apparatus of claim 15, wherein the plurality of communication lines comprise digital subscriber lines (DSL) of a DSL communication system.

17. The apparatus of claim 15, wherein the transmitter is located at a central office of the DSL communication system.

18. A communication system comprising:
   a plurality of receivers; and
   a transmitter configured to obtain a first set of estimated crosstalk coefficients for at least a selected portion of a plurality of communication channels over which signals are to be transmitted from the transmitter to at least a selected portion of the plurality of receivers, adjust a first set of signals based on the first set of estimated crosstalk coefficients to generate a first set of adjusted signals, transmit the first set of adjusted signals to corresponding ones of the plurality of receivers, obtain a second set of estimated crosstalk coefficients for the selected portion of the plurality of communication channels, and adjust a second set of signals for transmission based on the second set of estimated crosstalk coefficients to generate a second set of adjusted signals, wherein iteration of the obtaining, adjusting and transmitting steps is performed so as to reduce an error between subsequent estimated crosstalk coefficients and actual crosstalk coefficients for the plurality of communication channels, wherein the steps of adjusting the first set of signals and the second set of signals each further comprise iteratively setting power levels of corresponding ones of the signals, and wherein a power level is chosen according to a distribution of the error between subsequent estimated crosstalk coefficients and actual crosstalk coefficients.

19. The method of claim 1, wherein a given crosstalk coefficient comprises at least one measurement of interference on a given one of the plurality of communication channels.

20. The method of claim 1, wherein the signals comprise at least one of one or more data signals and one or more pilot signals.

21. The method of claim 1, wherein each of the first set of estimated crosstalk coefficients and the second set of estimated crosstalk coefficients are generated from measurements made at a plurality of different time intervals.

22. The method of claim 1, wherein the distribution of the error comprises a probability distribution of the error.

23. The method of claim 1, wherein choosing the power level according to the distribution of the error comprises determining a bounding distribution for the error.

24. The method of claim 23, wherein choosing the power level according to the distribution of the error further comprises selecting the power level to be consistent with the determined bounding distribution.

* * * * *